United States Patent
Kuebler et al.

(10) Patent No.: US 6,839,509 B2
(45) Date of Patent: Jan. 4, 2005

(54) FLUID HEATER CONTROL APPARATUS AND METHOD WITH OVERTEMPERATURE PROTECTION

(75) Inventors: Karl-Heinz Kuebler, Grand Blanc, MI (US); Daryl G. Harris, Oxford, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/377,345

(22) Filed: Feb. 28, 2003

(65) Prior Publication Data

US 2004/0170414 A1 Sep. 2, 2004

(51) Int. Cl.⁷ .................................................. F24H 1/10
(52) U.S. Cl. .................................... 392/484; 137/334
(58) Field of Search ................................. 392/465–484

(56) References Cited

U.S. PATENT DOCUMENTS

| | | |
|---|---|---|
| 653,629 A | 7/1900 | Schneider |
| 941,215 A | 11/1909 | Wade |
| 1,523,156 A | 1/1925 | Adams |
| 1,636,190 A | 7/1927 | Mattoney |
| 2,833,909 A | 5/1958 | Levey .......................... 219/39 |
| 3,014,251 A | 12/1961 | Sstern .......................... 20/40.5 |
| 3,202,447 A | 8/1965 | Whaley ....................... 294/87.2 |
| 3,292,866 A | 12/1966 | Bonner ........................ 239/284 |
| 3,332,045 A | 7/1967 | Rodaway ...................... 335/81 |
| 3,338,476 A | 8/1967 | Marcoux .................... 222/146 |
| 3,427,675 A | 2/1969 | Tibbet |
| 3,489,884 A | 1/1970 | Wasekeski ................... 219/522 |
| 3,553,428 A | 1/1971 | McGhee ...................... 219/494 |
| 3,632,042 A | 1/1972 | Goulish ....................... 239/130 |
| 3,668,757 A | 6/1972 | Rieden ....................... 29/157.3 |
| 3,716,886 A | 2/1973 | Klomp ..................... 15/250.04 |
| 3,756,510 A | 9/1973 | Nitterl ......................... 239/129 |
| 3,785,359 A | 1/1974 | Whittaker ................... 126/19.5 |
| 3,888,412 A | 6/1975 | Lundo ..................... 237/12.3 B |
| 3,891,827 A | 6/1975 | Wyse .......................... 219/302 |
| 3,977,436 A | 8/1976 | Larmor ................... 137/625.65 |
| 3,979,068 A | 9/1976 | Applebaum ............. 239/284 R |
| 4,090,668 A | 5/1978 | Kochensur ................... 239/130 |
| 4,106,508 A | 8/1978 | Berlin ........................ 128/346 |
| 4,159,026 A | 6/1979 | Williamson ............. 137/625.5 |
| 4,177,375 A | 12/1979 | Meixner ...................... 219/441 |
| 4,212,425 A | 7/1980 | Schlick ........................ 239/133 |
| 4,248,383 A | 2/1981 | Savage ........................ 239/284 |
| 4,253,493 A | 3/1981 | English ................. 137/625.18 |
| 4,295,111 A | 10/1981 | Frosch ........................ 335/256 |
| 4,295,769 A | 10/1981 | Douthett ..................... 411/411 |
| 4,306,589 A | 12/1981 | Harned .................. 137/625.65 |
| 4,358,652 A | 11/1982 | Kaarup .................... 219/10.55 |
| 4,403,756 A | 9/1983 | Berlin ......................... 244/223 |
| 4,417,116 A | 11/1983 | Black |
| 4,430,994 A | 2/1984 | Clawson ................ 128/203.27 |

(List continued on next page.)

FOREIGN PATENT DOCUMENTS

| | | |
|---|---|---|
| AU | 222081 | 11/1957 |
| CA | 1216713 | 1/1987 |
| CA | 2133592 | 4/1995 |

(List continued on next page.)

Primary Examiner—Thor Campbell
(74) Attorney, Agent, or Firm—J. Gordon Lewis

(57) ABSTRACT

A fluid heater apparatus has fluid discharge temperature control to prevent temperature overshoot. A plurality of heater elements are employed and at least certain of the heater elements are independently controllable. At least one of the heater elements is employed as a "finishing" heater element, with the other heating elements deactivated to enable the "finishing" heater element to more slowly elevate the temperature of the fluid in the body from a first temperature reached by activation all or most of the heater elements to the predetermined discharge temperature. One of more of the heater elements may have a different power output than the other heater elements.

10 Claims, 6 Drawing Sheets

U.S. PATENT DOCUMENTS

| | | | |
|---|---|---|---|
| 4,489,863 A | 12/1984 | Horchos | 222/504 |
| 4,508,957 A | 4/1985 | Rocchitelli | 219/305 |
| 4,524,797 A | 6/1985 | Lungu | 137/343 |
| 4,534,539 A | 8/1985 | Dettmann | 251/65 |
| 4,561,632 A | 12/1985 | Hugler | 251/129.15 |
| 4,574,841 A | 3/1986 | Hugler | 137/625.44 |
| 4,589,374 A | 5/1986 | Farina | 122/14 |
| 4,669,430 A | 6/1987 | Reinhold | 123/179 |
| 4,689,548 A | 8/1987 | Mechlemburg | 323/243 |
| 4,690,371 A | 9/1987 | Bosley | 251/65 |
| 4,832,262 A | 5/1989 | Robertson | 239/129 |
| 4,858,576 A | 8/1989 | Jeffries | 123/145 |
| 4,877,186 A | 10/1989 | Scholl | 239/75 |
| 4,894,520 A | 1/1990 | Moran | 219/497 |
| 4,905,904 A | 3/1990 | Ohara | 239/284.1 |
| 4,927,060 A | 5/1990 | Snowball | 222/146.5 |
| 4,948,948 A * | 8/1990 | Lesage | 392/454 |
| 4,975,630 A | 12/1990 | Ma | 323/300 |
| 5,012,977 A | 5/1991 | Karklins | 239/284.1 |
| 5,074,471 A | 12/1991 | Baumgarten | 239/284.1 |
| 5,118,040 A | 6/1992 | Abe | 239/284.1 |
| 5,168,595 A | 12/1992 | Naylor, Jr. | 15/250.4 |
| 5,180,896 A | 1/1993 | Gibby | 219/10.55 |
| 5,183,099 A | 2/1993 | Bechu | 165/41 |
| 5,203,049 A | 4/1993 | Nogawa | 15/250.02 |
| 5,247,148 A | 9/1993 | Mencher | 219/10.55 |
| 5,249,623 A | 10/1993 | Miller | 165/156 |
| 5,254,083 A | 10/1993 | Gentelia | 604/35 |
| 5,280,806 A | 1/1994 | Glazebrook | 137/517 |
| 5,289,698 A | 3/1994 | Garimella | 62/498 |
| 5,293,446 A * | 3/1994 | Owens et al. | 392/449 |
| 5,318,071 A | 6/1994 | Giaardo | 137/625.65 |
| 5,345,968 A | 9/1994 | Day | 137/625.46 |
| 5,351,934 A | 10/1994 | Jensen | 251/65 |
| 5,354,965 A | 10/1994 | Lee | 219/202 |
| 5,369,247 A | 11/1994 | Doljack | 219/485 |
| 5,383,247 A | 1/1995 | Nickel | 15/250.04 |
| 5,421,727 A | 6/1995 | Stevens | |
| 5,428,206 A | 6/1995 | Uchida | 219/505 |
| 5,433,382 A | 7/1995 | Baumgarten | 239/284.1 |
| 5,509,606 A | 4/1996 | Breithayst | 239/130 |
| 5,598,502 A | 1/1997 | Takahashi | 392/502 |
| 5,636,407 A | 6/1997 | Len | 15/250.19 |
| 5,673,360 A | 9/1997 | Scripps | 392/405 |
| 5,676,868 A | 10/1997 | Simmons | 219/202 |
| 5,727,769 A | 3/1998 | Suzuki | 251/129.15 |
| 5,784,751 A | 7/1998 | Tippets | 15/250.04 |
| 5,808,277 A * | 9/1998 | Dosani et al. | 219/481 |
| 5,881,428 A | 3/1999 | Simmons | 15/250.04 |
| 5,927,608 A | 7/1999 | Scorirobli | 239/284.1 |
| 5,947,348 A | 9/1999 | Briski | 222/640 |
| 5,957,384 A | 9/1999 | Lansinger | 239/284.1 |
| 5,979,796 A | 11/1999 | Ponziani | 239/284.1 |
| 5,988,529 A | 11/1999 | Suhring | 239/284.1 |
| 6,009,369 A | 12/1999 | Boisvert | 701/99 |
| 6,019,418 A | 2/2000 | Emerling et al. | |
| 6,029,908 A | 2/2000 | Petzold | 239/284.1 |
| 6,032,324 A | 3/2000 | Lansinger | 15/250.04 |
| 6,119,300 A | 9/2000 | Schmid | 15/250.04 |
| 6,131,989 A | 10/2000 | Montone et al. | |
| 6,133,546 A | 10/2000 | Bains | 219/202 |
| 6,148,258 A | 11/2000 | Boisvert | 701/99 |
| 6,164,564 A | 12/2000 | Franco | 239/284.1 |
| 6,199,587 B1 | 3/2001 | Shlomi | 137/625.5 |
| 6,234,564 B1 | 5/2001 | Kim | |
| 6,236,019 B1 | 5/2001 | Piccione | 219/203 |
| 6,247,653 B1 | 6/2001 | Seyfarth | 239/284.1 |
| 6,257,500 B1 | 7/2001 | Petzold | 239/284.1 |
| 6,260,608 B1 | 7/2001 | Kim | 165/41 |
| 6,271,506 B1 | 8/2001 | Glaser | 219/505 |
| 6,374,046 B1 * | 4/2002 | Bradenbaugh | 392/463 |
| 6,435,596 B1 | 8/2002 | Pyo | |
| 6,523,882 B2 | 2/2003 | Ishikawa et al. | |
| 2002/0040895 A1 | 4/2002 | Lopez et al. | |
| 2002/0137455 A1 | 9/2002 | Ivanov et al. | |

FOREIGN PATENT DOCUMENTS

| | | |
|---|---|---|
| CA | 2176539 | 11/1997 |
| DE | 854 403 | 11/1952 |
| DE | 23 53 738 | 9/1980 |
| DE | 3430 653 | 8/1984 |
| DE | 3 507 900 | 11/1986 |
| DE | 35 26 430 | 5/1987 |
| DE | 39 07 968 | 9/1990 |
| DE | 19820220 | 11/1999 |
| DE | 19935134 | 1/2001 |
| EP | 1 006 029 | 11/1999 |
| EP | 1 006 030 | 11/1999 |
| EP | 1 213 197 | 12/2000 |
| EP | 1162118 | 12/2001 |
| FR | 2 585 311 | 1/1987 |
| FR | 2 605 273 | 4/1988 |
| FR | 2 609 437 | 7/1988 |
| FR | 2 677 939 | 12/1992 |
| FR | 2 707 230 | 7/1993 |
| GB | 370687 | 5/1931 |
| GB | 1 318 498 | 5/1973 |
| GB | 1 451 666 | 10/1974 |
| GB | 2 044 601 | 10/1980 |
| GB | 2 121 681 | 1/1984 |
| GB | 2 225 096 | 5/1990 |
| GB | 2 260 399 | 4/1993 |
| GB | 2 271 276 | 4/1994 |
| GB | 2 271 712 | 4/1994 |
| GB | 2 290 461 | 1/1996 |
| GB | 2 308 971 | 7/1997 |
| GB | 2 310 795 | 9/1997 |
| GB | 2320086 | 6/1998 |
| GB | 2320088 | 6/1998 |
| GB | 2 331 231 | 5/1999 |
| GB | 2354 688 | 11/2000 |
| GB | 2 350 555 | 12/2000 |
| JP | 63-93652 | 4/1988 |
| JP | 2053656 | 2/1990 |
| JP | 2234866 | 9/1990 |
| JP | 4-38248 | 2/1992 |
| JP | 8312824 | 11/1996 |
| WO | WO 9746431 | 12/1997 |
| WO | WO 98/49036 | 11/1998 |
| WO | WO 98/58826 | 12/1998 |
| WO | WO 99/56993 | 11/1999 |
| WO | WO 00/04754 | 2/2000 |
| WO | WO 00/27540 | 5/2000 |
| WO | WO 02/92237 | 11/2002 |

* cited by examiner

FLUID HEATER CONTROL APPARATUS AND METHOD WITH OVERTEMPERATURE PROTECTION

BACKGROUND

This invention relates, in general, to fluid heater apparatus and, more particularly, to fluid heater apparatus which provide a heated wash fluid to a cleanable surface, and, still more specifically, to a heated wash fluid apparatus for a vehicle windshield wash system.

It is necessary in many diverse applications to quickly elevate the temperature of a fluid to a higher use temperature. For example, it is desirable to be able to provide instant hot water, for use in homes, offices and campers, as well as for industrial processes.

In cleaning applications, it is known that hot fluid removes dirt and other debris from a surface much better and much faster than colder fluids. One heated fluid application is a vehicle wash fluid system, such as a windshield wash system as well as vehicle wash systems applied to camera lenses, exterior lamps and lamp lenses, mirrors, etc. Vehicles are typically provided with at least one and usually multiple windshield washers which are used to clear the field of vision in a windshield or rear backlight.

Typically, a nozzle or spray device is provided adjacent to or as part of the windshield wiper to disperse a pattern of wash fluid onto the windshield prior to and during the wiping operation to improve the efficiency of the wiping operation so as to provide a clear field of vision for the driver or vehicle passengers. The wash fluid is typically stored in a reservoir in the engine compartment and is pumped through the spray device upon manual activation of a control actuator by the vehicle driver.

Since it is known that warm or heated fluid provides better cleaning efficiency than cold fluid, it is known to provide a heated wash fluid to a vehicle window spray device. However, there is an upper limit to the temperature at which the wash fluid can be heated to avoid evaporation and energy waste. Single element heaters limit the possibilities available for control of the heating sequence since the single heating element is either on or off.

Thus, it would be desirable to provide a fluid heater apparatus which provides a heated fluid in an efficient manner with minimum energy and without heating the fluid to a temperature above the preset maximum operating temperature to avoid evaporation of the fluid.

SUMMARY

The present invention is a method and apparatus for controlling the discharge temperature of a fluid from a fluid heater apparatus to prevent fluid overtemperature. In one aspect, the method includes the steps of:

providing fluid in an enclosure;

providing heating means as a plurality of heating elements for imparting thermal energy to the fluid in the enclosure;

control means for controlling at least two of the heating elements independent of each other;

activating at least one of the heating elements for a first time period to quickly impart thermal energy to the fluid;

monitoring the temperature of the fluid; and at a first temperature less than a preset maximum discharge fluid temperature maintaining a minimal number of heating elements in an activated state to more slowly elevate the temperature of the fluid to the preset maximum discharge temperature.

In another aspect, the method further comprises the steps of activating all of the heater elements simultaneously to elevate the temperature of the fluid up to the first temperature, and maintaining at least one of the heater elements in an activated state to elevate the temperature of the fluid to the preset discharge temperature.

In another aspect, the method further comprises the steps of activating certain of the heater elements to elevate the temperature of the fluid to the first temperature, and deactivating the certain of the heater elements and activating another heating element to elevate the temperature of the fluid to the preset discharge temperature.

In another aspect, the present invention defines an apparatus for heating fluid. In this aspect, the apparatus includes:

an enclosing having a fluid flow path therethrough for receiving fluid;

a plurality of heater elements thermally coupled to the enclosure for imparting thermal energy to the enclosure and fluid in the enclosure; and control means for controlling the plurality of heater elements, with at least two of the heater elements being controlled independent of each other; and wherein the control means includes means for activation at least of the heating elements for a first time period to impart thermal energy to the fluid to elevate the temperature of the fluid in the body to a first temperature less than a preset maximum discharge fluid temperature and activating at least one other heating element to elevate the temperature of the fluid in the body from the first temperature to the preset maximum discharge temperature.

In yet another aspect, the present invention is an apparatus for providing a heated fluid to clean a vehicle surface. In this aspect, the apparatus includes:

an enclosure;

a fluid flow path extending through the enclosure for receiving cleaning fluid;

a plurality of heater elements thermally coupled to the enclosure for imparting thermal energy to the enclosure and the fluid in the enclosure;

control means for controlling the plurality of heater elements, with at least two of the heater elements being controlled independent of each other; and wherein the control means includes means for activation at least of the heating elements for a first time period to impart thermal energy to the fluid to elevate the temperature of the fluid in the body to a first temperature less than a preset maximum discharge fluid temperature and activating at least one other heating element to elevate the temperature of the fluid in the body from the first temperature to the preset maximum discharge temperature.

In any of the different aspects of the present invention, one or more of the plurality of heater elements may have a different power output or rating than the other heater elements. This enables, for example, a lower power output heating element to act as the finishing and maintaining heater element to reduce total power requirements for the heater module.

The method and apparatus of the present invention uniquely prevents overtemperature of the discharge fluid about the preset maximum temperature which could lead to disadvantageous evaporation of the heated fluid as well as waste of electrical power. The use of a plurality of controllable heater elements enables one of the heater elements to be designated as a "finishing" heater element to more slowly elevate the temperature of the fluid up to the preset discharge temperature or to be activated independently after the other heater elements have been deactivated.

BRIEF DESCRIPTION OF THE DRAWING

The various features, advantages and other uses of the present invention will become more apparent by referring to the following detail description and drawing in which.

DETAILED DESCRIPTION

Figure 1:
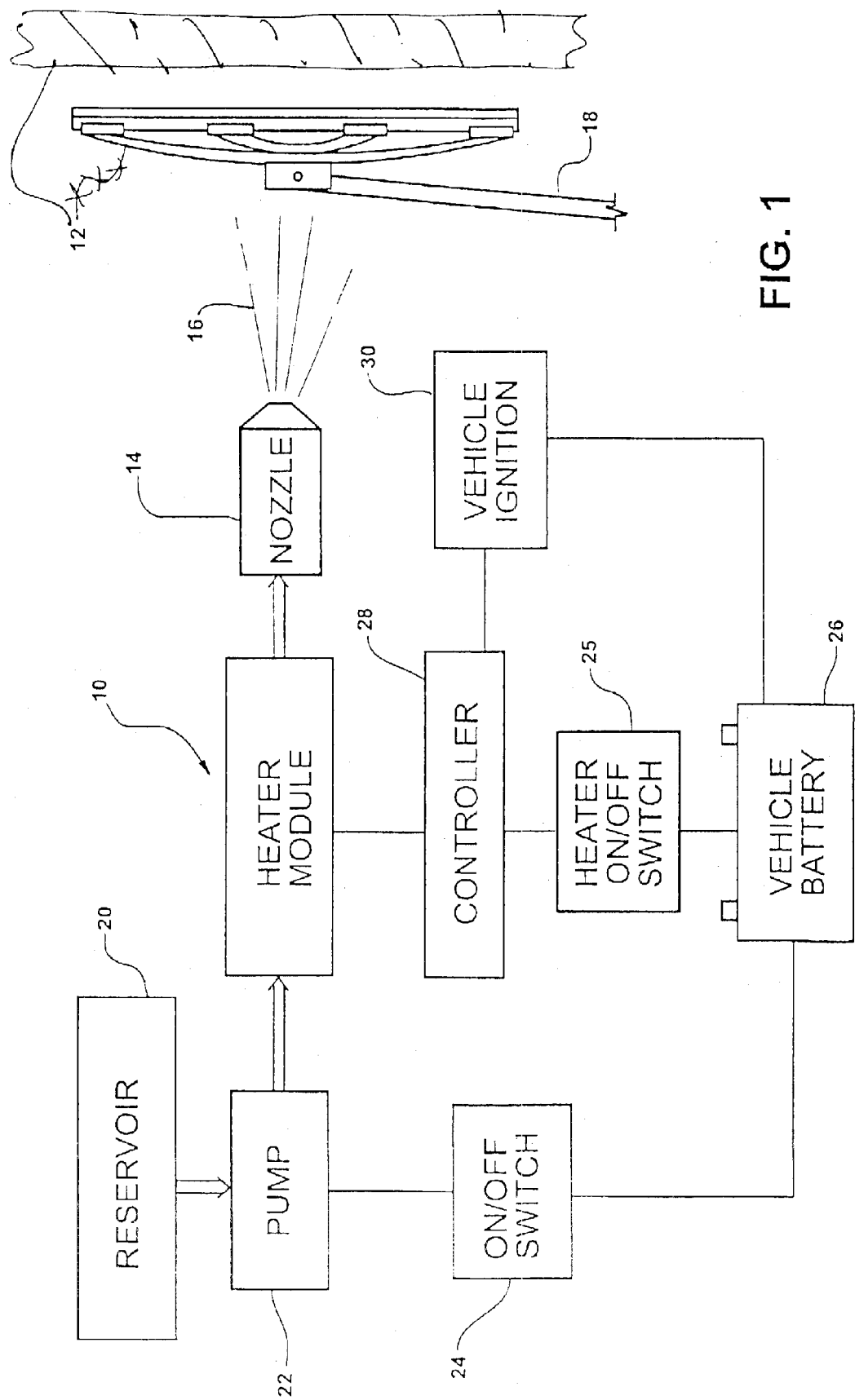
FIG. 1 is a block system diagram of a fluid heater apparatus according to the present invention used in an exemplary vehicle window wash fluid delivery system.
Figure 2:
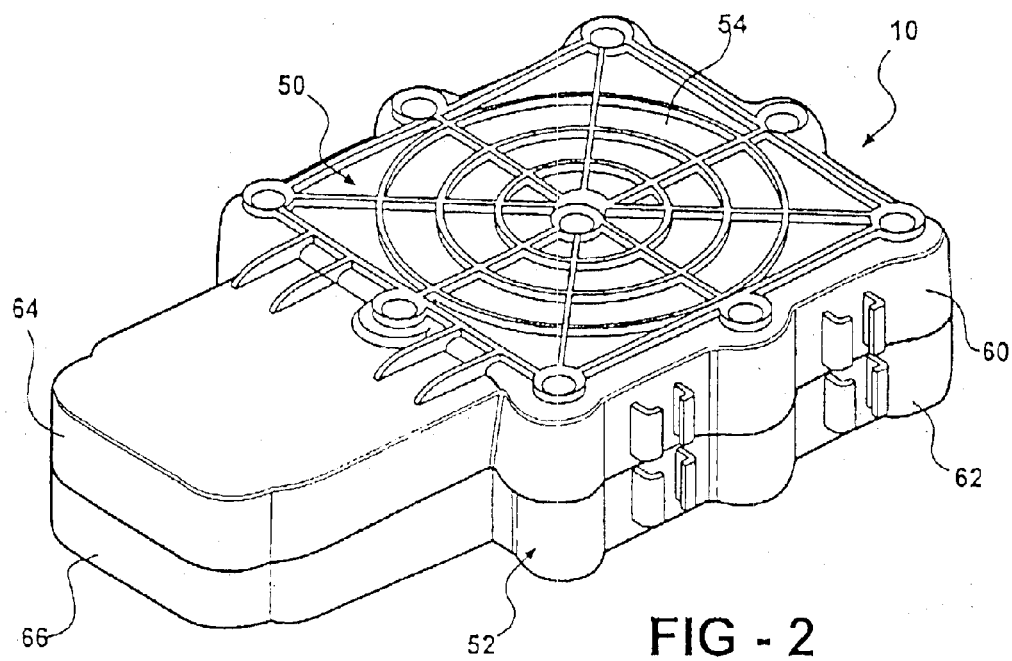
FIG. 2 is a perspective view of a heater module according to one aspect of the present invention.

Referring now to FIG. 1, there is depicted an environment in which a heater apparatus or module 10 constructed in accordance with the teachings of the present invention can be advantageously utilized. Although the following use of the heater module 10 of the present invention is described in conjunction with a vehicle window wash system, it will be understood that the present heater module may be employed in other applications requiring heated fluid, such as any cleaning system used to clean any vehicle window, i.e., the windshield, rear backlight, or side windows, as well as cleaning systems for other vehicle surfaces such as mirrors, camera, lenses, sensor covers, etc.

It will be understood that the following description of a heater module which uses heater elements embedded in a thermally conductive mass through which a fluid flow path extends is only one example of a heater apparatus which is capable of advantageously using the fluid temperature control of the present invention. For example, fluid heaters employing heater elements mounted in direct or semi-direct contact with a fluid flow can also employ the features of the present invention.

As is conventional, a vehicle window 12, such as a windshield, rear backlight or window, etc., has one or more fluid delivery devices, such as spray nozzles 14 located in a position to dispense or spray a pattern 16 of wash fluid onto the exterior surface of the window 12. The dispersion of the wash fluid 16 is usually in conjunction with activation of a windshield wiper 18 over the window 12.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is suppled with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as 65° C. to about 70° C., by example only, by the heater module 10. A suitable control circuit or controller 28 is provided for controlling the operation of the heater elements in the heater module 10. The controller 28 is also supplied with electric power from the vehicle battery 26. The controller 28 is activated by a "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

Referring now to FIGS. 2–9, there is depicted one aspect of the heater module 10 according to the present invention.

The heater module 10 includes a heat exchange mass or body 40 formed of a suitable high thermally conductive material. Although the mass 40 is described as being formed of die-cast, molded or machined aluminum, other materials, either homogenous or non-homogenous, may also be employed. For example, the mass 40 can be formed of alumina particles, ceramic materials, etc.

The mass 40, as described in greater detail hereafter, includes a fluid flow path between an inlet 42 and an outlet 44. The inlet and outlet 42 and 44, respectively, receive a fitting 46 and an outer sleeve 48 which are joined together for receiving a fluid sealed connection to a fluid flow conduit, element or tube, not shown. The inlet 42 will be connected to receive the pump output from the window wash fluid reservoir 20; while the outlet 44 will be connected to the spray nozzle(s) 14.

As vehicles typically have several spray nozzles 14, usually one for each of the two windshield wipers, and at least one nozzle 14 for the rear backlight or rear window wiper, it will be understood that the following description of a single heater module 10 for heating all of the fluid discharge from the fluid reservoir 20 will encompass multiple parallel paths, each containing a separate heater module, for heating fluid from the reservoir 20 for each different nozzle 14.

The heat exchange mass 40 is disposed within an insulated enclosure formed by a first cover 50 and a mating second cover 52. The first and second covers 50 and 52 have complementary shapes with a major wall surface 54 and 56, respectively, and a surrounding peripheral lip 60 and 62, respectively.

A necked-down end portion 64 and 66 is formed in each of the first and covers 50 and 52, and forms an extension from one end of the respective major walls 54 and 56 as well as from the peripheral edge lips 60 and 62. The necked-down portions 64 and 66, when joined together, form an end cavity for receiving a connector assembly 70 which connects electrical conductors to the heating element(s). mounted in the joined first and second covers 50 and 52.

The first and second covers 50 and 52 and the beat exchange mass 40 are fixedly joined together, after the connector assembly 70 has been disposed in the extensions 64 and 66 of the first and second covers 50 and 52 by suitable means, such as by heat stake rivets or projections 76 projecting outwardly from opposite major surfaces of the heat exchange mass 40. The projections 76 engage apertures in the major surfaces 60 and 62 of the first and second housing parts 50 and 52 and are heat welded together to join the first and second housing parts 50 and 52 together in a fixed connection.

Figure 3:
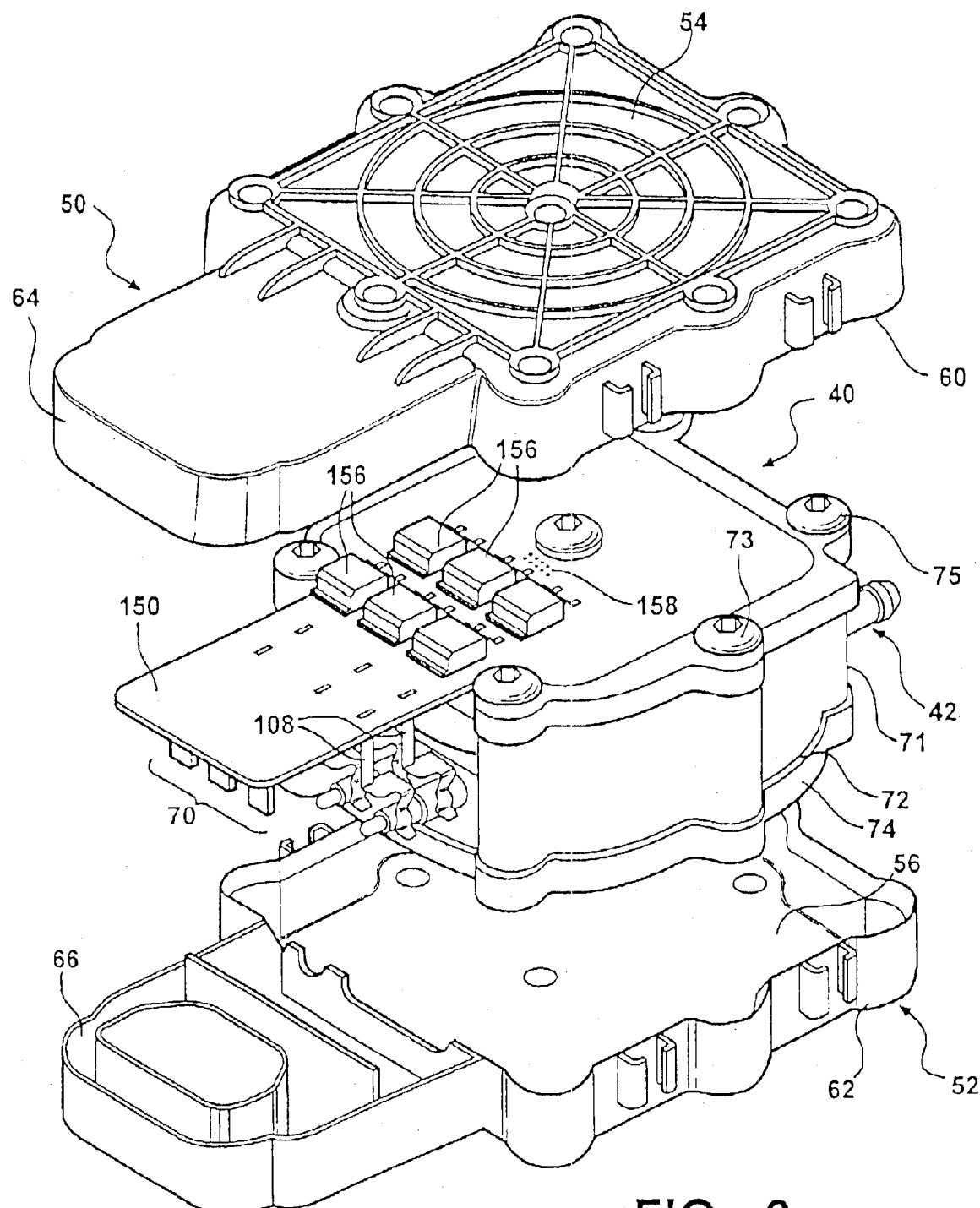
FIG. 3 is an exploded perspective view of the heater module shown in FIG. 2.
Figure 5:
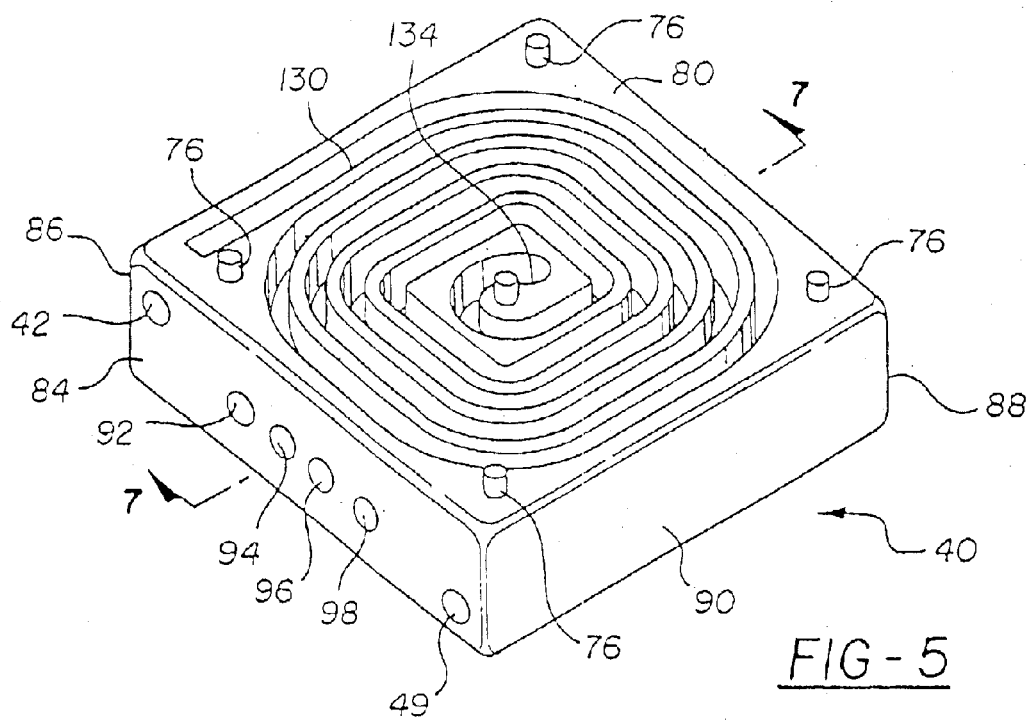
FIG. 5 is a top perspective view of the heater module thermal mass.

A pair of seal elements 71 and 72, each having a peripheral shape substantially the same as the peripheral shape of the heat exchange mass 40 are disposed on opposite surfaces of the heat exchange mass 40 as shown in FIG. 3. The seal members 71 and 72 are formed of a high thermal resistant, insulating material. The seal members 71 and 72 seal the open ends of the flow paths through the heat exchange mass 40 as described hereafter.

Upper and lower plates 73 and 74, each also having a shape complimentary to the shape of the heat exchange mass 40, are disposed in contact with the upper and lower seals 71 and 72, respectively, and fixed thereto by suitable fastening means, such as nuts and bolts 75 which extend through apertures in each of the upper and lower plates 73 and 74, the upper and lower seals 71 and 72 and the heat exchange mass 40. The upper and lower plates 73 and 74 are formed of a good thermal conductive material, such as aluminum.

As shown in detail in FIGS. 4–7, the heat exchange mass 40 has a solid cubical shape formed of a first major surface 80, a second opposed major surface 82, and four sidewalls 84, 86, 88 and 90, interconnecting the first and second surfaces 80 and 82.

A plurality of bores 92, 94, 96 and 98 are formed in the body 40 and project inwardly from the sidewall 84. The bores 92, 94, 96 and 98 are each adapted for receiving one generally cylindrical heater element. As partially shown in FIG. 4, each bore, such as bores 96 and 98, extend through the solid central portion of the mass 40 so as to be completely surrounded by the solid material of the mass 40. This defines the mass 40 as a heat source after receiving heat from activation of the heater elements describe hereafter.

In the aspect of the invention shown in FIGS. 4–7, the heater elements are formed of "calrod". Although different materials many be used, one example of a calrod construction is a Nichrome wire inside of a stainless steel sheath.

Figure 4:
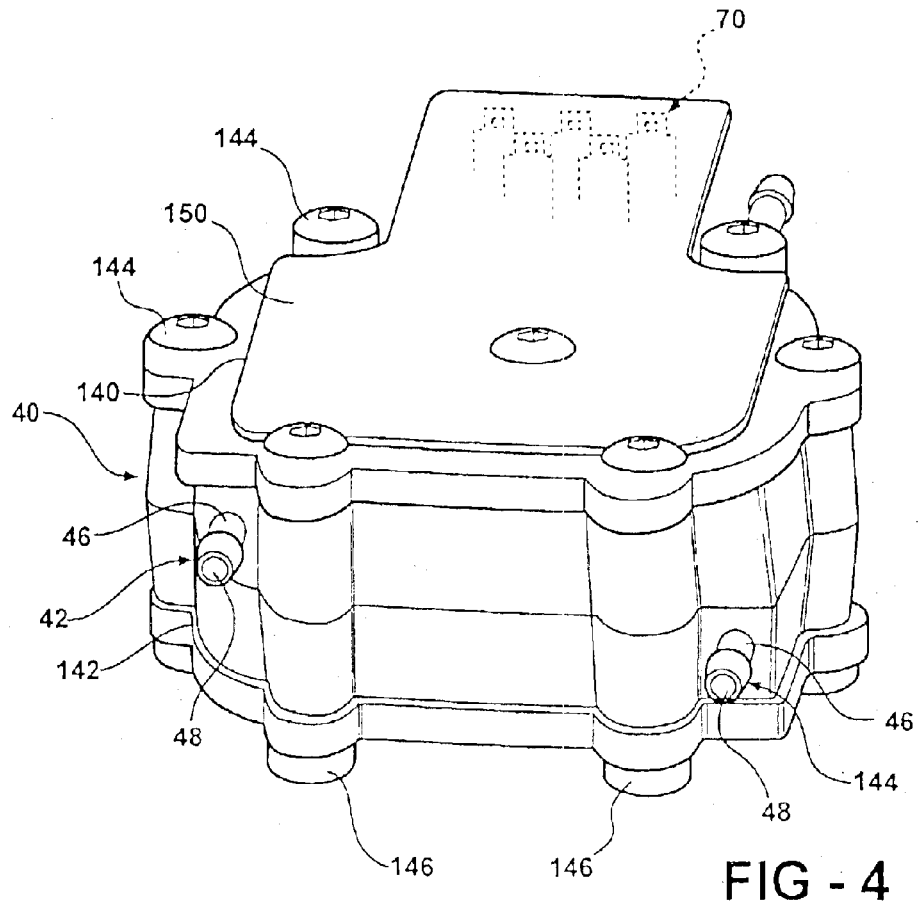
FIG. 4 is a perspective view, taken from the right side of FIG. 3, of the heater module of the present invention.

By way of example only, at least one and preferably a plurality, i.e., two or three or more individual heater elements 100, 102 and 103, with only heater elements 100, 102 being shown in FIG. 4, are disposed in the bores 96, 94 and 98. The function of the one or more heater elements, such as heater elements 100 and 102, will be described hereafter in conjunction with the description of the heater module 10.

Figure 7:
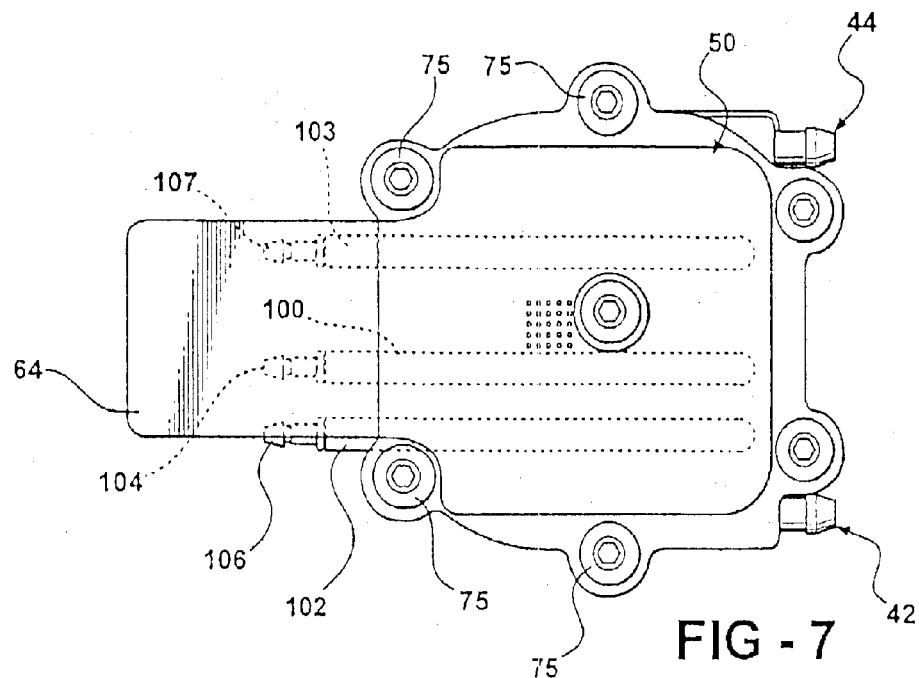
FIG. 7 is a plan view of the interior of the heater module shown in FIG. 4.

As seen in FIGS. 4 and 7, one end 104, 106 and 107 of each heater element, elements 100, 102 and 103, respectively, projects outwardly through the sidewall 84 of the body 40. The ends 104, 106 and 107 of the heater elements 100, 102 and 103 respectively, engage individual terminals 108 extending from a printed circuit board 150 mounted by means of fasteners, adhesives, etc., to an exterior surface of the upper plate 73. Conductive traces in the printed circuit board connect the terminals 108 with the connector terminals 70 to receive power from the vehicle electrical system.

The circuit board 150 is fixedly mounted by suitable fasteners such as screws. One of the terminals 108 acts as a ground lead in that an end portion is disposed in contact with the outer stainless steel sheath of each heater element or calrod 100, 102 and 103. Another of the terminals 108 is the power lead for calrod 100. This terminal 108 provides electric power to the calrod 100 through contact with the end 104 of heater element 100 in the grid assembly 110.

The fasteners 75 also fix the printed circuit board 150 which forms part of the controller 28 onto the heat exchange body 40, typically over the first plate 140.

The other two terminals 108 provide power connections to the other two heater elements 102 and 103. A switch, not shown, may be interposed between the terminal 108 and the other two terminals 108 to selectively provide power to the other two terminals 108 when power is supplied to the power terminal. This switch can be a bi-metal switch, for example, which will open at a predetermined temperature, such as 50° C., as described hereafter. Alternately, a switch controlled by the circuitry on the circuit board 150 of the controller 28 will selectively connect power from the power terminal 108 to the other terminals 108. This provides the controller 28 with the capability, when receiving suitable external input signals from the vehicle body controller, for example, to deactivate the heater module 10, during the occurrence of low vehicle battery power, a thermal event, etc.

As shown in FIGS. 4–7, the thermally conductive mass 40 includes a fluid flow channel or path which extends from the inlet 42 to the outlet 44. The fluid flow path has a labyrinthian path formed of a first fluid flow path portion 130 and a second fluid flow path or channel 132 which are connected at a generally centrally disposed bore 134. The first fluid flow channel 130 has a generally spiral shape formed of alternating straight and arcuate sections which alternate create laminar and turbulent flow of the fluid passing through the first flow channel 130 to maximize the heat absorption of the fluid from the adjoining walls of the mass 40. Further, the first fluid flow channel 130 has an inward directed spiral shape from the inlet 42 to the bore 134 to minimize temperature differential between adjoining portions of the spiral shaped first flow channel 130.

Figure 6:
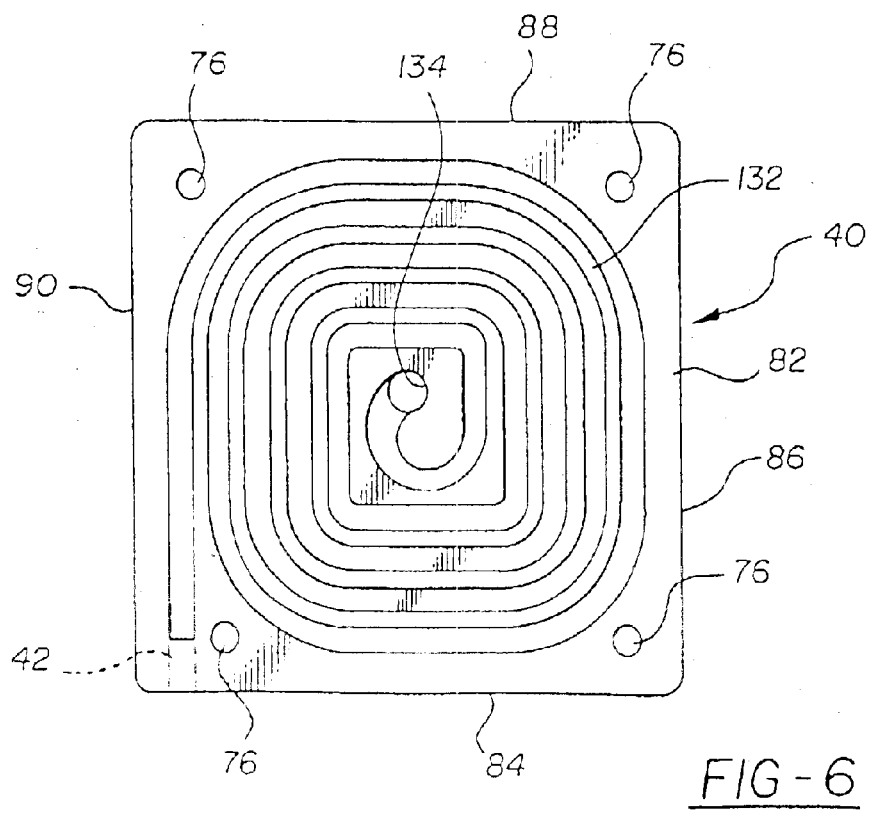
FIG. 6 is a bottom elevational view of the heater module thermal mass shown in FIG. 5.

As shown in FIG. 6, the second fluid flow channel 132 has a substantially identical spiral shape. However, fluid flow through the second fluid flow channel 132 is in a outward spiral direction from the bore 134 to the outlet 44. As described above, the seal members 71 and 72 sealingly close the open ends of the first and second fluid flow channels 130 and 132.

Thus, fluid flow through the first and second flow channels 130 and 132 starts from the inlet 44 then continues in a spirally inward directed manner through the first flow channel 130 to the central passage or bore 134. Upon exiting the central passage 134 into the second flow channel 132, fluid flow progresses in an outward spiral direction through the second flow channel 132 to the outlet 44.

In operation, the heater module 40 will be interconnected in the vehicle wash fluid flow lines between the pump 22 and the spray nozzle(s) 14 as shown in FIG. 1. The external connector is then connected to the connector housing 70 to provide electric power from the vehicle battery 26 and the controller 28 to the heater elements 100, 102 and 103, in the heat exchange body 40.

Assuming that the first and second fluid flow channels 130 and 132 in the body 40 are filled with fluid, when the controller 28 activates the heater elements 100, 102 and 103 according to the control sequence described hereafter, the heater elements 100, 102 and 103 will begin radiating heat which will immediately raise the temperature of the entire surrounding portion of the heat exchange body 40. Heat from the body 40 will, in turn, be radiated to and absorbed by the fluid disposed in the first and second flow channels 130 and 132.

The straight and arcuate portions of the first and second fluid flow channels 130 and 132 create alternating turbulent and laminar flow regions in the fluid flowing through the mass 40 which causes movement of the fluid in the first and second flow channels 130 and 132 bringing all molecules in the fluid in contact with the wall of the body 40 forming the first and second flow channels 130 and 132 to efficiently absorb the maximum amount of heat possible. This causes the temperature of the fluid to be quickly raised from ambient temperature at the inlet 42 to approximately 65° C.–70° C., at the outlet 44 in approximately sixty seconds, for example.

The fluid in the first and second fluid flow channels 130 and 132 removes or absorbs heat from the thermal mass 40 thereby increasing the fluid temperature by physical contact with the mass 40. The heater elements 100, 102 and 103 maintain the heat of the thermal mass 40 at a predetermined temperature thereby preventing hot spots from occurring in the fluid. Normally, hot spots would occur when the fluid comes in direct contact the heater elements 100, 102 and 103. Fluid which is not in physical contact with the heater elements 100, 102 and 103 passes the heater elements 100, 102 and 103 by and does not absorb heat. By heating the thermal mass 40, the physical hot contact area is increased along with an increase in heat transfer efficiency. This requires less energy to heat the same volume of fluid.

Although a single heater element 100 may be employed as the heat source in the body 40, two, three, four or even more heater elements can be employed. Three heater elements 100, 102 and 103, are described by way of example only. The controller 28 can activate all of the plurality of heater elements 100, 102 and 103 upon receiving a first command to dispense heated wash fluid onto the windshield 12. This generates a maximum amount of heat to the body 40 to immediately and quickly raise the temperature of the body 40 high enough to transfer sufficient heat to the fluid in the fluid flow channels 130 and 132 to raise the temperature of the fluid to the desired discharge temperature of 65° C.–70° C. The multiple heater elements 100, 102 and 103 can remain in an activated state by the controller 28 if immediate and successive commands from the on/off switch 24 are supplied by the vehicle driver to supply additional charges of fluid onto the windshield 12.

Figure 10:
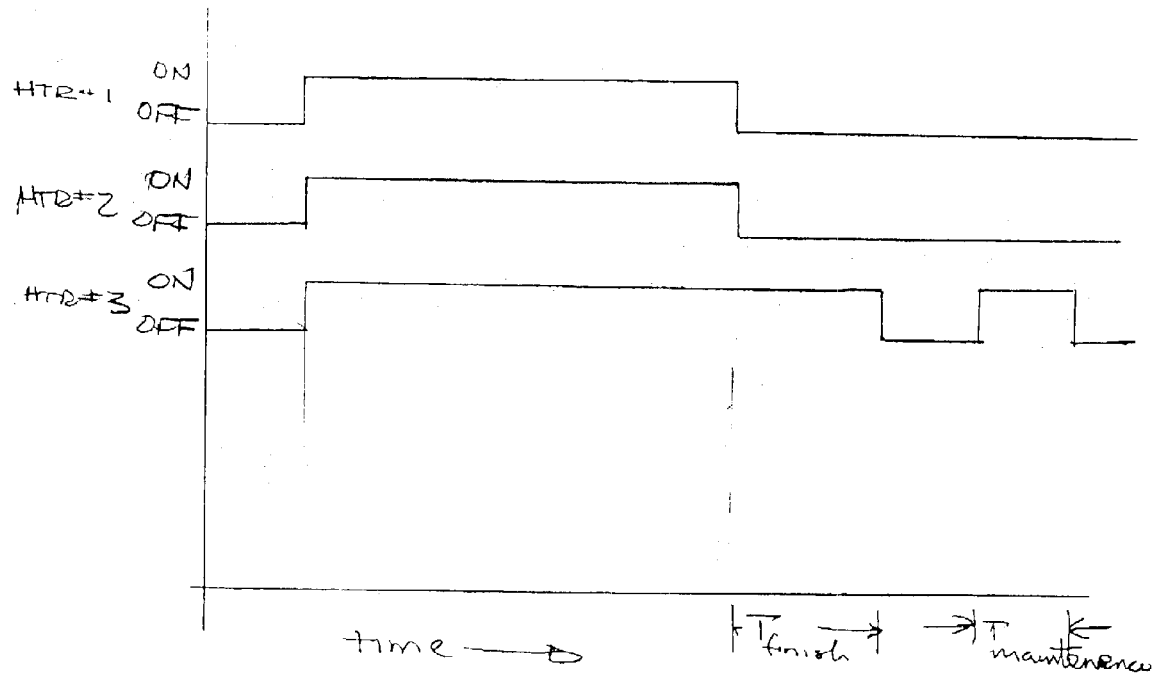
FIG. 10 is a graph depicting the time sequence of activation of the heater elements according to one aspect of the present invention.

According to one aspect of the present invention as shown in FIG. 10, the controller 28 executes a control program which provides independent control of any or all of the heater elements 100, 102, and 103. In this aspect of the invention, one of the heater elements, such as heater element 103, is designated as the "finishing" heater element. When a maximum amount of heat is to be imparted to the thermal mass 40, the controller 28 can activate all three of the heater elements 100, 102, and 103. The controller 28 monitors the output of the temperature sensor which detects the temperature of the thermal mass or the temperature of the fluid passing through the thermal mass 40 and deactivates two of the heater elements 100 and 102 at a first temperature lower than the preset maximum preset discharge temperature of approximately 70° C., by example only. However, the third heater element 103 is maintained in an activated or "on" state to elevate the temperature of the thermal mass 40 or the fluid in the thermal mass 40 more slowly up to the preset discharge temperature, "$T_{finish}$", of about 70° C. The controller 28 may cycle the "finishing" heater element 103 on and off as shown by time periods labeled $T_{maintenance}$ to maintain the temperature of the fluid at the preset discharge temperature.

Figure 11:
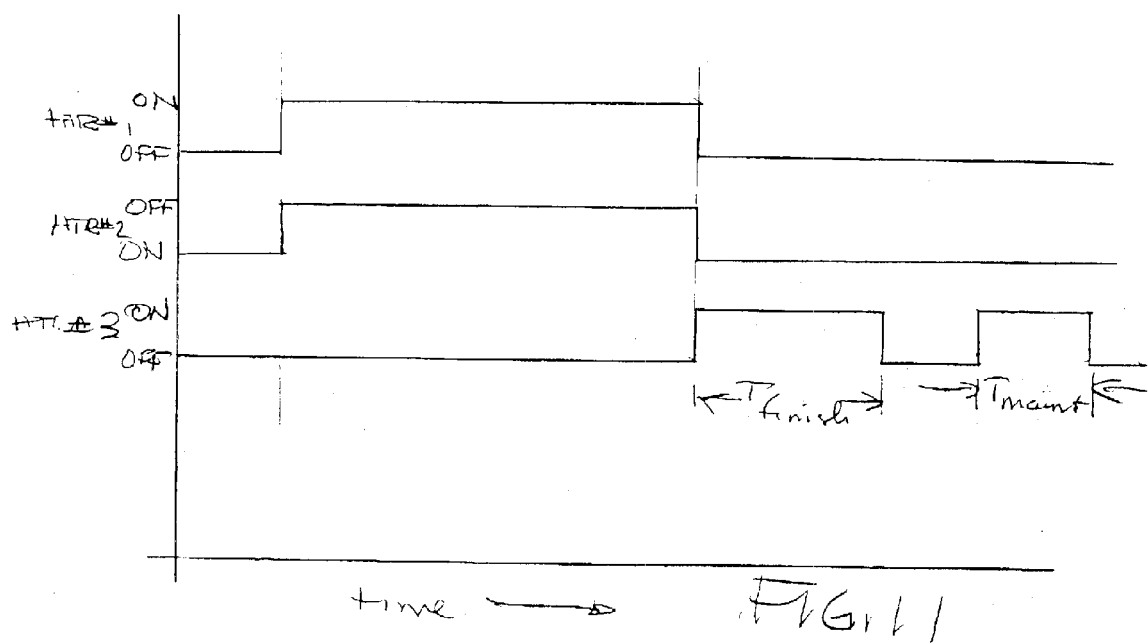
FIG. 11 is a graph depicting the time sequence of activation of the heater elements according to another aspect of the present invention.

According to another aspect of the invention, maximum heat may be imparted to the thermal mass 40 by two of the heater elements 100 and 102 as shown in FIG. 11. The third heater element 103 is still designated as the "finishing" heater element and is turned on or activated by the controller 28 when the temperature of the thermal mass 40 reaches the first temperature slightly less than the preset discharge fluid temperature of about 70°. At this time, the controller 28 activates the "finishing" heater element 103 for a time period necessary to elevate the temperature of the fluid in the thermal mass 40 up to the preset discharge temperature. The heater element 103 may be cycled on or off to maintain the temperature at the preset discharge temperature as shown by alternating time periods labeled $T_{maintenance}$.

The above description of one of the more the plurality of heater elements being activated for maximum heat application to the thermal mass 40 and at least one of the heater elements acting as a finishing or maintenance heater element, is a general description of the function of the various heater elements regardless of their particular power output. For example, all three heaters 100, 102 and 103 in the present example, can have the same power output, such as 300 watts.

It is also possible in the present invention to provide the plurality of heater elements with different power output. For example, the two heater elements 100, 102 in the three heater element example described above, can have the same high power output, such as 300 watts. The third heater element 103, which acts as a finishing and maintenance heater element can have lower power output, such as 100 watts. This allows the application of heat to the thermal mass 40 to be supplied at a slower rate when only the finishing heater element 103 is activated to thereby raise the temperature of the thermal mass 40 slowly to the final operating temperature. The lower power output of the heater element 103 is also sufficient to maintain the thermal mass 40 at the desired operating temperature since less power is required to maintain a given temperature than to raise the temperature of the thermal temperature 40 from a low temperature to the higher operating temperature.

It will be understood that the different power output of the heater elements applies in either the above examples for the operation the finishing heater elements.

In heater element configurations having different numbers of heater elements, the finishing heater elements can be provided with different power output than the heater elements employed to rapidly increase the temperature of the thermal mass 40. Thus, it is possible in the present invention to employ a single heater element 100 having a high power output, such as 300 watts, for the rapid heat application to the thermal mass 40 and the remaining two heater elements 102 and 103 with a lower power output, such as 100 watts, by example only, for use as the finishing and maintaining heater elements.

In heater modules having four or more heater elements, different combinations of the heater elements can be employed in both of the examples described above as rapid heat application heater elements and/or finishing and maintaining heater elements. Added flexibility can be provided by having different ones of the heater elements divided in different power output ratings.

The advantage of having less than all of the plurality of heater elements 100, 102, and 103 function as a separately controllable, "finishing" heater element enables the controller 28 to prevent temperature overshoot which could lead to evaporation of the fluid and the waste of electrical power. The "finishing" heater element can be the only heater element employed to maintain the temperature of the fluid in the thermal mass at the preset discharge temperature between discharge cycles thereby decreasing electrical power requirements since all of the heater elements are not required to be turned "on" or "off" during the temperature maintenance $T_{maintenance}$ cycles.

Although the following description of the use of high amperage switching devices known as MOSFETs, are used as part of the controller 28 and to provide the necessary high current, typically 50 amps at 12 volts, to the heating elements 104, 106 and 107 in the thermal mass 40, other high amperage switching devices may also be employed. Any number of MOSFETs 156 can be mounted in any configuration on the printed circuit board 150.

A plurality of bores 158 are optionally formed through the printed circuit board 150. The bores 158 improve heat flow between the switching devices on the printed circuit board (PCB) 150 and the underlying first plate 73.

A temperature sensor 159, such as a PTC, is mounted on the printed circuit board 150, typically over or adjacent to the bores 158. The temperature sensor 159 measures the temperature of the printed circuit board 150 and provides a temperature proportional signal to the controller 28 which is used by the controller 28 to control the on/off cycle of the heating elements 104, 106 and 107.

Figure 8:
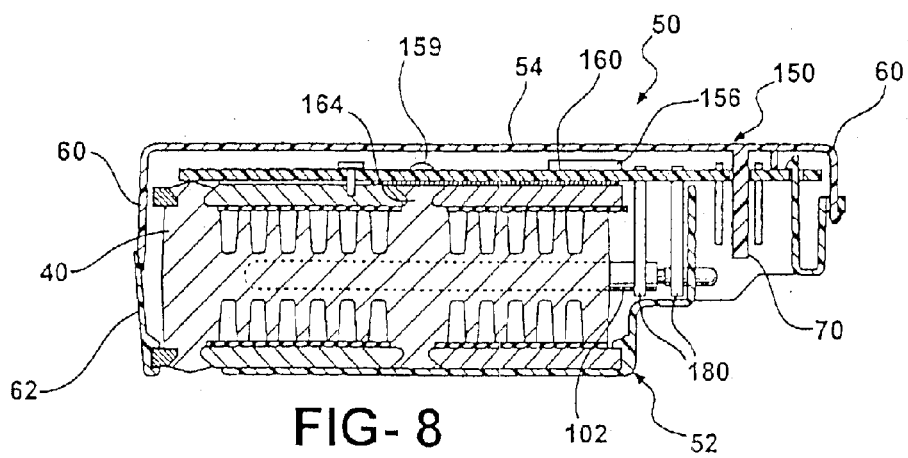
FIG. 8 is a longitudinal, cross-sectional view of the heater module shown in FIGS. 2–7.
Figure 9:
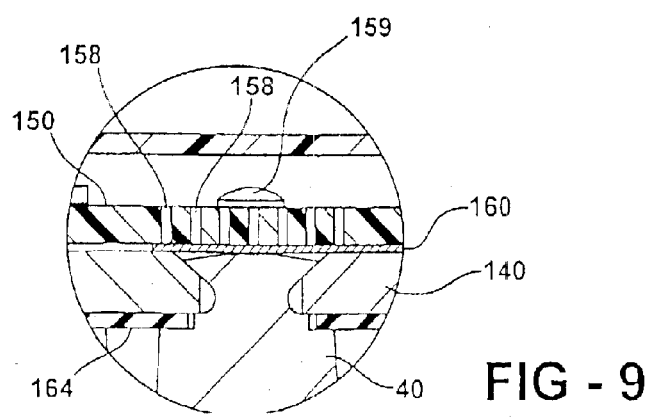
FIG. 9 is an enlarged, side cross-sectional view of a portion of the heater module shown in FIG. 8.

To further enhance transfer of the heat generated by the MOSFETs 156 to the first plate 140, a highly conductive pad or plate 160, hereafter referred to as a sill pad 160, is interposed in contact between the printed circuit board 150 and the first plate 23 as shown in FIGS. 3, 8 and 9. The sill pad 160 typically has a planar shape and dimensions to extend over at least a portion of the first plate 73. The pad 160 isolates stray electrical currents to negative ground through the screws 75, provides a positive contact between the MOSFETs and the thermal mass 40, and stabilizes heat loss through the adjacent cover by maintaining the temperature of the plate 73 at a higher temperature to thereby create a lower temperature differential or gradient with respect to the thermal mass 40.

As shown in FIG. 9, a projection extends from the thermal mass 40.

The sill pad 160 preferably has a higher thermal conductivity than the thermal conductivity of the plate 73 to efficiently draw heat generated by the MOSFETs 156 to the plate 73 thereby maintaining the temperature of the plate 73 at an elevated temperature. This elevated temperature of the plate 73 is higher than the normal temperature of the plate 73 caused by heat escaping from the sides of the thermal mass 40 around the seals 71 and 72.

The projection 164 and the thermal mass 40 engage apertures in the plate 73 as shown in FIGS. 8 and 9. A portion of the sill pad 160 extends over one of the projection 164 as shown in FIG. 9 and may be disposed in contact or registry with the projection 164 to provide a direct heat exchange path from the thermal mass 40 to the sill pad 160.

in summary, there has been disclosed a fluid heater apparatus which efficiently heats and maintains a fluid to a desired discharge temperature with minimum power requirements and without temperature overshoot.

What is claimed is:

1. A method of heating fluid in a vehicle surface wash fluid discharge apparatus comprising the steps of:
   providing fluid in an enclosure;
   providing a plurality of heating elements for imparting thermal energy to the fluid;
   controlling at least two of the heating elements independent of each other;
   activating certain ones of the heating elements for a first time period to impart thermal energy to the fluid to rapidly increase the fluid temperature;
   monitoring the temperature of the fluid; and
   at a first temperature less than a preset maximum discharge fluid temperature, activating certain ones of the heating elements to more slowly elevate the temperature of the fluid to the preset maximum discharge temperature to minimize overshoot of the fluid temperature above the maximum discharge temperature.

2. The method of claim 1 wherein the step of activating certain heating elements comprise the steps of:
   activating all of the heater elements to bring the temperature of the fluid up to the first temperature; and
   maintaining at least one of the heater elements in an activated state to elevate the temperature of the fluid from the first temperature to the preset discharge temperature.

3. The method of claim 1 further comprising the step of:
   providing at least one of the plurality of heater elements with a different power output than the other heater elements.

4. The method of claim 3 wherein the step of providing at least one heater element with a different power output further comprises the step of:
   providing the at least one heater element with a lower power output than the other heater elements.

5. The method of claim 1 wherein the steps of activating certain heating elements further comprise the steps of:
   activating certain ones of the heater elements to elevate the temperature of the fluid up to the first temperature;
   deactivating the certain ones of the heater elements and activating another heating element to elevate the temperature of the fluid from the first temperature to the preset discharge temperature.

6. An apparatus for heating fluid in a vehicle surface wash fluid discharge system comprising:
   means for providing fluid in an enclosure;
   a plurality of heating elements for imparting thermal energy to the fluid;
   means for controlling at least two of the heating elements independent of each other;
   means for activating certain heating elements for a first time period to impart thermal energy to the fluid to rapidly increase the fluid temperature;
   means for monitoring the temperature of the fluid; and
   means, responsive to the temperature monitoring means at a first temperature less than a preset maximum discharge fluid temperature, for activating another one other of the heating elements to more slowly elevate the temperature of the fluid to the preset maximum discharge temperature more slowly to minimize overshoot of the fluid temperature above the maximum discharge temperature.

7. The apparatus of claim 6 further comprising:
   at least one of the heating elements having a different power output than the other heating elements.

8. An apparatus for heating fluid in a vehicle surface wash fluid discharge system comprising:

an enclosure having a fluid flow path therethrough for receiving fluid;

a plurality of heater elements thermally coupled to the enclosure for imparting thermal energy to the enclosure and the fluid in the enclosure; and control means for controlling the plurality of heater elements, with at least two of the heater elements being controlled independent of each other; and wherein the control means includes means for activating at least certain of the heating elements for a first time period to impart thermal energy to the fluid to rapidly increase the temperature of the fluid in the body to a first temperature less than a preset maximum discharge fluid temperature and activating certain heating elements to more slowly elevate the temperature of the fluid in the body from the first temperature to the preset maximum discharge temperature to minimize overshoot of the fluid temperature above the maximum discharge temperature.

9. The apparatus of claim 8 wherein the control means further comprises:

means for deactivating all of the heating elements activated to elevate the temperature of the fluid to the first temperature; and means for activating at least another one heating element to elevate the temperature of the fluid from the first temperature to the first preset maximum discharge temperature.

10. The apparatus of claim 8 wherein:

at least one of the heater elements has a different power output than the other heating elements.

* * * * *